United States Patent
Mueckenheim et al.

(10) Patent No.: US 7,675,895 B2
(45) Date of Patent: Mar. 9, 2010

(54) METHOD AND APPARATUS FOR WIRELESS COMMUNICATION USING VOICE OVER INTERNET PROTOCOL

(75) Inventors: Jens Mueckenheim, Nuremberg (DE); Mirko Schacht, Allersberg (DE); Said Tatesh, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1235 days.

(21) Appl. No.: 10/940,421

(22) Filed: Sep. 14, 2004

(65) Prior Publication Data

US 2006/0056404 A1 Mar. 16, 2006

(51) Int. Cl.
*H04J 3/00* (2006.01)
(52) U.S. Cl. .............. 370/345; 370/468; 370/474; 370/477; 455/450
(58) Field of Classification Search ........... 370/389, 370/349, 352, 252, 345, 346, 347, 348, 350, 370/468, 474, 477; 455/450
See application file for complete search history.

(56) References Cited

U.S. PATENT DOCUMENTS

2003/0103515 A1* 6/2003 Brown et al. ............. 370/412
2005/0207408 A1* 9/2005 Elliott ..................... 370/389

FOREIGN PATENT DOCUMENTS

WO  WO 03/041424   5/2003
WO  WO 03/067833   8/2003

OTHER PUBLICATIONS

IETF RFC 3095: Robust Header Compression (ROHC): Framework and four profiles: RTP, UDP, ESP, and uncompressed, source: C. Bormann (ed.) Jul. 2001.
3 GPP TR 25.862: "RAB support for IMS," V. 1.1.0, Source: $3^{rd}$ Generation Partnership Project; Technical Specification Group Radio Access Network; RAB support for IMS (Release 6) 3GPP TR25.862 V1.3.0 Nov. 2004.
3 GPP TSG-RAN2 Meeting #38, Sophia Antipolis, France, R2-032142: "Handling of Variable Data Rates for Conversational IMS," Source: Siemens, Oct. 6-10, 2003.
International Search Report EP 05 25 5366 dated Jan. 18, 2006.

* cited by examiner

*Primary Examiner*—Simon Sing
*Assistant Examiner*—Simon King
(74) *Attorney, Agent, or Firm*—Williams, Morgan & Amerson, PC (57) ABSTRACT

The present invention provides a method of wireless telecommunication is provided. The method includes accessing a plurality of first data packets having a first size, accessing at least one second data packet having a second size, the second size being larger than the first size, forming a plurality of third data packets comprising portions of the at least one second data packet based upon the first and second sizes, and selecting at least one of the plurality of first data packets based upon the plurality of third data packets.

19 Claims, 5 Drawing Sheets

Figure 1

(Prior Art)

METHOD AND APPARATUS FOR WIRELESS COMMUNICATION USING VOICE OVER INTERNET PROTOCOL

BACKGROUND OF THE INVENTION

1. Field of the Invention

This invention relates generally to telecommunication, and, more particularly, to a wireless telecommunication system.

2. Description of the Related Art

Conventional circuit-switched wireless telecommunication networks allow a mobile unit to establish a fixed connection, or link, to the network via a radio bearer. For example, in the Universal Mobile Telecommunication System (UMTS) protocol, a first mobile unit may form a fixed wireless telecommunication link with a second mobile unit via an air interface to a first base station, a first mobile switching center, a first radio network controller, a Public Land Mobile Network (PLMN), a second radio network controller, a second mobile switching center, and a second base station. Although the link is generally referred to as a wireless telecommunication link, persons of ordinary skill in the art should appreciate that the circuit-switched network may include wired and/or wireless connections between some elements of the network.

A single base station can establish a plurality of concurrent wireless telecommunication links with a plurality of mobile units using a plurality of channels. For example, in a Code Division Multiple Access (CDMA) protocol, each mobile unit may be associated with one of a plurality of orthogonal codes. The number of codes (sometimes referred to as the "spreading factor"), and thus the number of concurrent radio bearers that may be established by the base station, is typically limited by the data transmission rate. In general, the higher the data transmission rate, the lower the number of codes that may be supported by a base station. For example, a single base station may support up to 128 codes when implementing an Adaptive Multi-Rate (AMR) coding scheme that uses a coding rate of approximately 12 kbps. However, persons of ordinary skill in the art should appreciate that other factors, such as interference limits, soft handover overhead, and the like, may also influence the number of codes.

Voice and data may also be transmitted over a packet-switched network using a Voice over Internet Protocol (often referred to as VoIP). The Voice over Internet Protocol is increasingly common, at least in part because VoIP can handle voice and data communications homogeneously. Moreover, transmitting voice with VoIP may help reduce operational costs. In addition to conventional land-line telephones and cellular telephones, VoIP may be used to incorporate voice communications in devices such as personal data assistants, laptop computers, desktop computers, and the like.

To implement VoIP in a conventional wireless telecommunication network, the speech data frames are embedded in Internet Protocol (IP) data packets. The IP packet headers may increase the size of the data packets that are transmitted by the wireless telecommunication network. For example, the IP packet header for a speech data packet formed according to IP version 6 and using AMR 12.2 kbps coding would be about 300% of the size of a normal speech data frame. Consequently, the capacity of a packet-switched wireless telecommunication network would be reduced by a factor of about 3 relative to a circuit-switched wireless telecommunication network. In some instances, the IP packet headers may be compressed to reduce the overhead associated with transmitting speech data using VoIP. One compression method reduces the size of the IP packet header by removing predictable and/or static information from the header. For example, the size of the IP packet header may be reduced from about 60 bytes to about 2-3 bytes by reducing the information in the IP packet header to a sequence number, a context identifier, and a time stamp.

Figure 1:
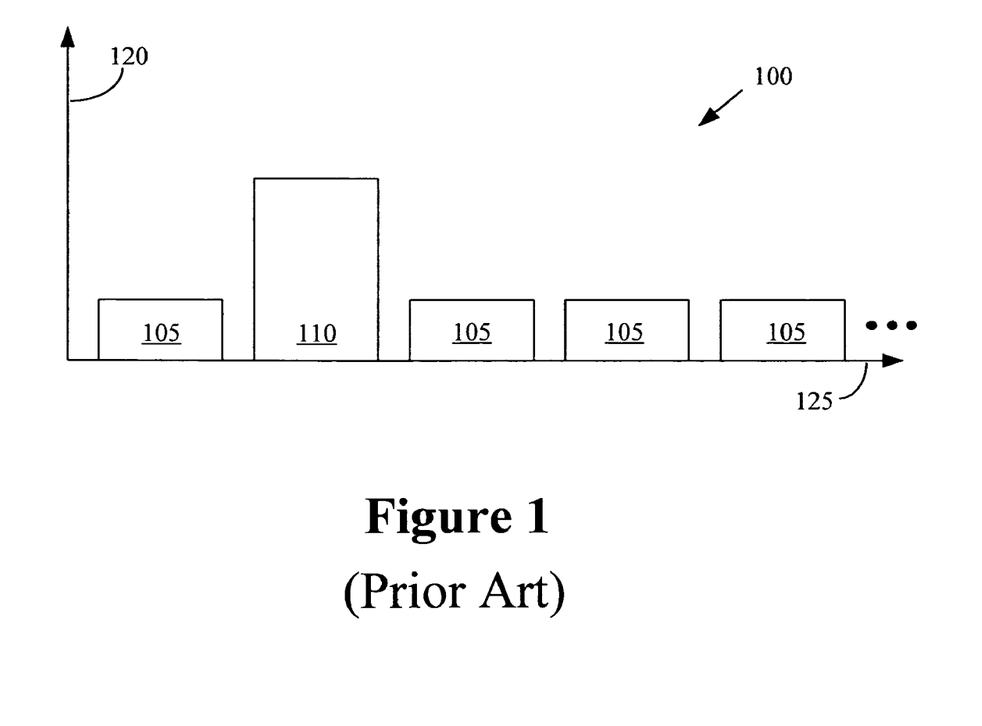
FIG. 1 conceptually illustrates a conventional data stream including a plurality of compressed data packets and an uncompressed data packet.

Not all IP packet headers may be compressed. For example, uncompressed or partially compressed IP packet headers may be sent when a mobile unit is being initialized or resynchronized, or when the network is recovering from an error. The uncompressed, or partially compressed, IP packet headers may include static and/or dynamic information that may be used to resynchronize the mobile unit or to recover from one or more transmission errors. FIG. 1 conceptually illustrates a conventional data stream 100 including a plurality of compressed data packets 105 and an uncompressed data packet 110. The vertical axis 120 indicates the size of the data packets 105, 110 and the horizontal axis 125 indicates the transmission time (or time slot) associated with the data packets 105, 110. The wireless telecommunication network is not generally able to predict when (or in what time slot) an uncompressed, or partially compressed, IP packet header will be required, so sufficient bandwidth should be reserved to transmit the uncompressed, or partially compressed, IP packet header when needed and/or requested.

One conventional technique for reserving bandwidth for the data packets that include the uncompressed, or partially compressed, IP packet header is to allocate a radio bearer that supports the data transmission rate required to transmit the uncompressed, or partially compressed, IP packet header without delay. This technique wastes a significant portion of the wireless telecommunication network resources because the spreading factor is then determined based upon the worst-case scenario in which the data transmission rate requirement for all data packets is determined based on the data rate requirement of the uncompressed, or partially compressed, IP packet headers. For example, as discussed above, the uncompressed IP packet header may be about 300% of the size of a normal speech data frame, so the required data transmission rate may be about triple the data transmission rate required to transmit compressed IP packet headers. Consequently, the spreading factor of a packet-switched wireless telecommunication network may be reduced by a factor of about three relative to the spreading factor of a circuit-switched wireless telecommunication network. Overall, this may degrade the wireless telecommunication network throughput by about a factor of three.

An alternative technique for reserving bandwidth for the data packets that include the uncompressed, or partially compressed, IP packet header is to allocate primary and secondary radio bearers having primary and secondary scrambling codes, respectively. In this technique, compressed data is transmitted using the primary radio bearer. The uncompressed or partially compressed IP packet headers, as well as the associated packet payloads, are transmitted using both the primary and secondary radio bearers.

Allocation of primary and secondary channels to carry uncompressed or partially compressed data packets has not yet been adopted in practice or as a wireless telecommunication standard, at least in part because of a number of recognized disadvantages. For example, allocating primary and secondary radio bearers may require important changes in the physical layer structure necessary to support transmission using a secondary scrambling code for the secondary radio bearer, such as specifying the distribution of the data over the primary and secondary codes and/or radio bearers. For another example, a loss of orthogonality between the primary and secondary scrambling codes may degrade the physical layer performance of the secondary scrambling code relative to transmitting the same data over two channels using a single scrambling code. For yet another example, the potential effects of interactions between the secondary scrambling code and the compression algorithm, which applies another scrambling code, have not yet been addressed.

Furthermore, adding a secondary radio bearer having a second scrambling code might not be sufficient to transmit the uncompressed, or partially compressed, IP packet header. As discussed above, the uncompressed IP packet header typically requires nearly 3 times the bandwidth of the compressed packets. Consequently, a third scrambling code might be required to transmit the uncompressed, or partially compressed, IP packet header, which makes the proposal more complicated and much more unlikely to be accepted as part of wireless telecommunication standards such as the 3rd Generation Partnership Project.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, a method of wireless telecommunication is provided. The method includes accessing a plurality of first data packets having a first size, accessing at least one second data packet having a second size, the second size being larger than the first size, forming a plurality of third data packets comprising portions of the at least one second data packet based upon the first and second sizes, and selecting at least one of the plurality of first data packets based upon the plurality of third data packets.

In another embodiment of the present invention, a method is provided for wireless telecommunication. The method includes receiving a plurality of first data packets having a first size and forming at least one second data packet having a second size based on the plurality of first data packets, the second size being larger than the first size.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
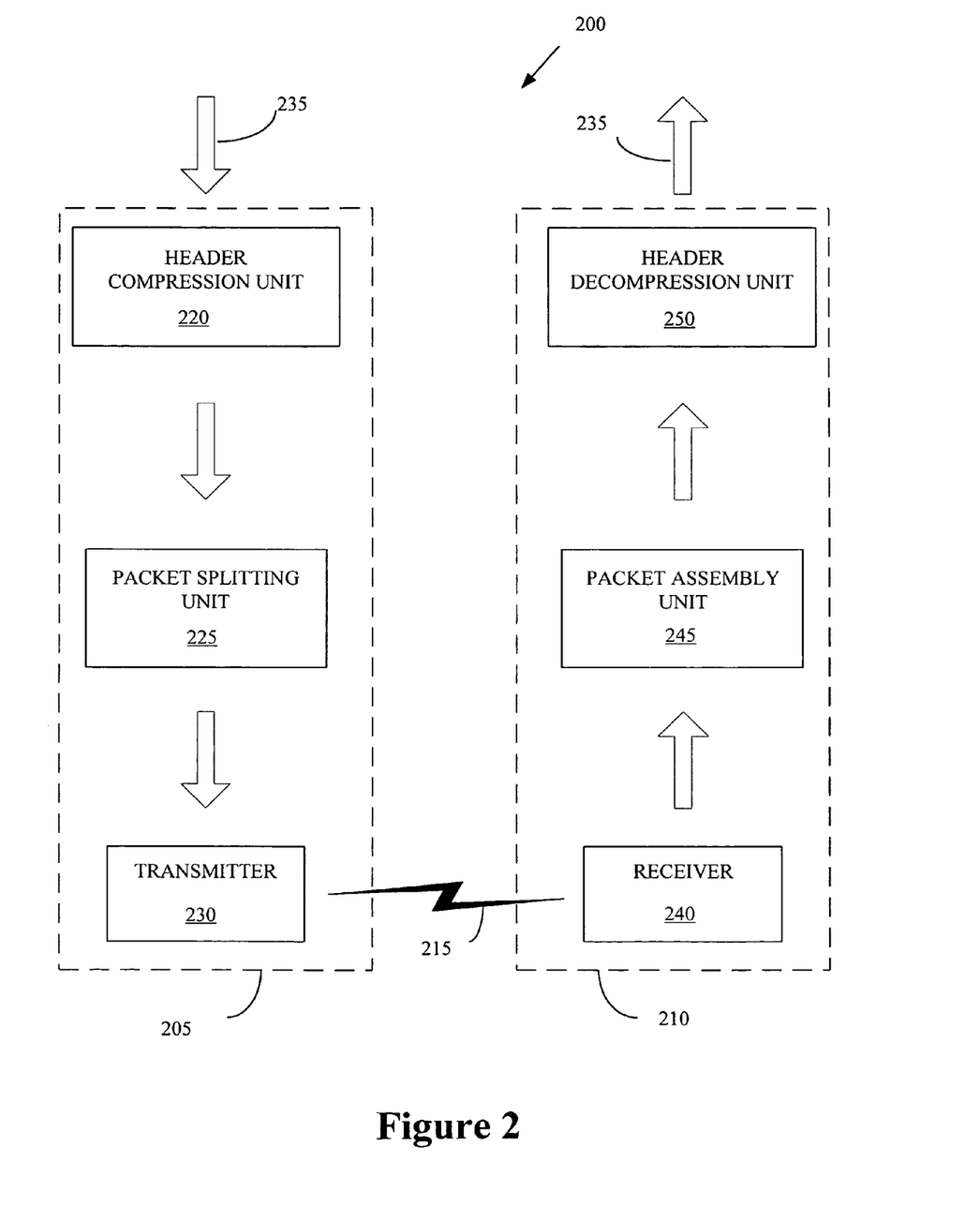
FIG. 2 conceptually illustrates a portion of a wireless telecommunication network that includes a transmission unit and a reception unit, in accordance with the present invention.

FIG. 2 conceptually illustrates a portion of a wireless telecommunication network 200 that includes a transmission unit 205 and a reception unit 210. In one embodiment, the transmission and reception units 205, 210 are end-user devices such as cell phones, personal data assistants, laptop computers, desktop computers, and the like. However, the present invention is not limited to end-user devices. In alternative embodiments, the transmission and/or reception units 205, 210 may be any desirable type of device, including a base station, a mobile switching center, a radio network controller, and the like that is capable of transmitting and/or receiving packet data via the wireless telecommunication network 200.

The transmission unit 205 and the reception unit 210 are communicatively coupled by a wireless telecommunication link 215. In one embodiment, the wireless telecommunication link 215 is an air interface formed between the transmission unit 205 and the reception unit 210. For example, the transmission unit 205 may transmit data to the reception unit 210 using a radio bearer that has been established over an air interface. However, persons of ordinary skill in the art should appreciate that the wireless telecommunication link 215 is not limited to air interfaces. In alternative embodiments, the wireless telecommunication link 215 may also include wired communication links and/or additional wireless interfaces. Moreover, the wireless telecommunication link 215 may include other devices (not shown) such as routers, splitters, switches, and the like.

The transmission unit 205 includes a header compression unit 220, a packet splitting unit 225, and a transmitter 230. Persons of ordinary skill in the art should appreciate that the transmission unit 205 may include other devices and/or functionality that are not shown in FIG. 2. However, in the interest of clarity, only those components of the transmission unit 205 that are necessary for a complete understanding of the present invention are shown. Furthermore, although the header compression unit 220, the packet splitting unit 225, and the transmitter 230 are depicted as separate entities in FIG. 2, persons of ordinary skill in the art should appreciate that the present invention is not limited to embodiments in which the header compression unit 220, the packet splitting unit 225, and/or the transmitter 230 are separate devices. In alternative embodiments, some functionality of these units may be combined into a single device. For example, as will be discussed in detail below, the header compression unit 220 may perform some functions related to packet splitting. Alternatively, functionality of the header compression unit 220, the packet splitting unit 225, and/or the transmitter 230 may be performed by a larger number of devices.

In operation, the header compression unit 220 receives uncompressed data packets from a data stream, as indicated by the arrow 235. The header compression unit 220 may compress one or more of the uncompressed data packets from the data stream 235. In one embodiment, the header compression unit 220 compresses the uncompressed data packets by removing static information, such as Internet addresses, and/or predictable dynamic information, such as a Real-time Transport Protocol (RTP) sequence number, an RTP timestamp, and the like, from the headers of the uncompressed data packets. For example, the size of the header of a data packet may be reduced from approximately 60 bytes to about 2-3 bytes by removing static and/or dynamic information from the header.

One or more uncompressed data packets in the data stream 235 may not be compressed by the header compression unit 220. For example, the header compression unit 220 may provide one or more uncompressed data packets for transmission so that the transmission unit 205 and/or the reception unit 210 may recover from one or more errors. For another example, the header compression unit 220 may provide one or more uncompressed data packets for transmission so that the transmission unit 205 and the reception unit 210 may be resynchronized. In one embodiment, the uncompressed data packets are larger than the compressed data packets. For example, a compressed data packet may include a compressed header having about 2-3 bytes and a speech data frame having about 32 bytes of information, whereas an uncompressed data frame may include a header having about 60 bytes and a speech data frame having about 32 bytes of information. Alternatively, one or more uncompressed data packets in the data stream 235 may be partially compressed by the header compression unit 220.

In one embodiment, the header compression unit 220 may provide a plurality of uncompressed data packets. For example, during initialization of the transmission and/or reception unit 205, 210, a plurality of consecutive uncompressed (or partially compressed) data packets may be provided in order to start initial work of the header compression algorithms. In one embodiment, the proposed method can be combined with dynamic radio bearer reconfiguration. For example, during initialization (or when a specific number of consecutive uncompressed packets have been detected), a network bandwidth may be adjusted according to the demand of the uncompressed data packets. After header compression moved into a steady state, which may be detected by receiving a specific number of compressed data packets, the network bandwidth may be reconfigured to the demand of the compressed data packets. This embodiment may allow header compression algorithms to converge faster with the slight disadvantage of consuming a higher bandwidth for a short time period during initialization.

The packet splitting unit 225 receives the uncompressed (or partially compressed) data packets from the header compression unit 220 and generates a plurality of data packets from each uncompressed (or partially compressed) data packet. For example, the packet splitting unit 225 may split the packet header and the payload of the uncompressed packet into a plurality of portions that may be used by the packet splitting unit 225 to form the plurality of data packets. Together, the plurality of data packets formed by the packet splitting unit 225 may contain substantially all of the information contained in the uncompressed data packets. However, persons of ordinary skill in the art should appreciate that the present invention is not limited to the plurality of data packets formed by the packet splitting unit 225 containing substantially all of the information contained in the uncompressed data packets. In various alternative embodiments, the plurality of data packets formed by the packet splitting unit 225 may contain more or less information than is contained in the uncompressed data packets.

In one embodiment, the packet splitting unit 225 generates a plurality of data packets containing approximately the same number of bytes as the compressed data packets provided by the header compression unit 220. Accordingly, the number of data packets formed by the packet splitting unit 225 may be approximately equal to the ratio of the size of an uncompressed (or partially compressed) data packet to the size of a compressed data packet. For example, if the size of the uncompressed data packet is approximately 90 bytes and the size of the compressed data packet is approximately 30 bytes, then the packet splitting unit 225 would provide the information contained in each uncompressed data packet in three data packets.

The packet splitting unit 225 also selects one or more compressed data packets from the data stream 235. In one embodiment, the packet splitting unit 225 selects a number of compressed data packets that is one less than the number of data packets formed by splitting the uncompressed (or partially compressed) data packet. For example, if the packet splitting unit 225 split the uncompressed data packet into three data packets, then the packet splitting unit 225 may select two compressed data packets. The selected compressed data packets may then be dropped from the data stream 235 and the data packets formed by splitting the uncompressed data packet are inserted into the data stream 235 at the positions vacated by the dropped compressed data packets so that the data packets formed by splitting the uncompressed data packet may be transmitted in the time slots associated with the uncompressed data packet and the selected compressed data packets.

The data packets in the data stream 235 are then provided to the transmitter 230. In various embodiments, the transmitter 230 may be any desirable type of transmitter, including a radio transmitter, a transceiver, and the like. The transmitter 230 may then transmit the data stream 235 over the air interface 215. Persons of ordinary skill in the art should appreciate that the transmitter 235 may also perform other functions, such as applying one or more channel codes, encrypting portions of the data stream 235, encoding portions of the data stream 235, interleaving portions of the data stream 235, and the like.

The data packets in the data stream 235 are received by a receiver 240 in the reception unit 210. In various embodiments, the receiver 240 may be any desirable type of receiver, including a radio receiver, a transceiver, and the like. Persons of ordinary skill in the art should appreciate that the receiver 240 may also perform other functions, such as decrypting portions of the data stream 235, decoding portions of the data stream 235, deinterleaving portions of the data stream 235, and the like.

A packet assembly unit 245 receives the data stream 235 including the compressed data packets and the split data packets. In one embodiment, the packet assembly unit 245 may combine the split data packets to reconstruct the uncompressed (or partially compressed) data packet. Since the plurality of data packets formed by the packet splitting unit 225 may contain substantially all of the information contained in the uncompressed data packet, the reconstructed data packet may be substantially the same as the original uncompressed (or partially compressed) data packet. However, persons of ordinary skill in the art should appreciate that the present invention is not limited to embodiments in which the reconstructed data packet is the same as the original uncompressed (or partially compressed) data packet. In various alternative embodiments, reconstructed data packets may contain more or less information than is contained in the uncompressed data packets.

The packet assembly unit 245 may then provide the data stream 235 to a header decompression unit 250 that may decompress the compressed data packets from the data stream 235. The header compression unit 250 may decompress one or more of the compressed data packets from the data stream 235 by adding static information, such as Internet addresses, and/or predictable dynamic information. However, persons of ordinary skill in the art should appreciate that the header decompression unit 250 is optional and may not be included in some embodiments of the present invention.

Figure 3A:
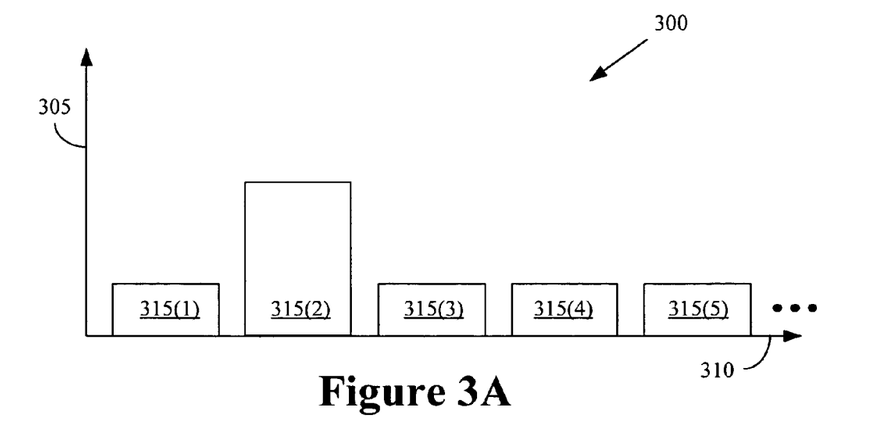
FIGS. 3A, 3B, and 3C conceptually illustrate a first embodiment of a data stream as the data stream is modified during operation of a first embodiment of the present invention.
Figure 3B:
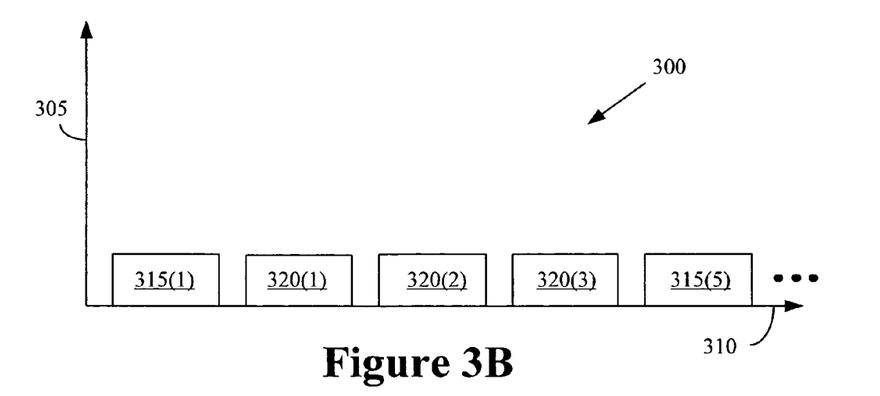
Figure 3C:
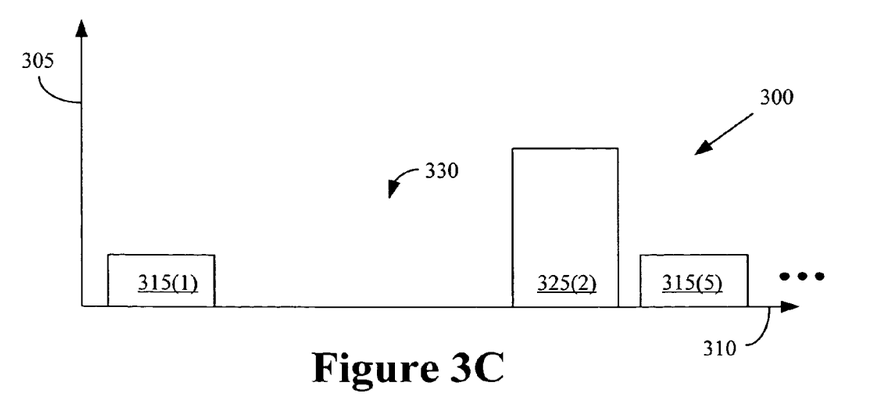

FIGS. 3A, 3B, and 3C conceptually illustrate a first embodiment of a data stream 300 as the data stream 300 is modified during operation of a first embodiment of the present invention. The vertical axis 305 in FIGS. 3A-C indicates the size of the data packets in the data stream 300. In various embodiments, the units of the vertical axis 305 may be bits, bytes, or any other desirable unit of measurement. The horizontal axis 310 in FIGS. 3A-C indicates the sequence of the data packets in the data stream 300. In various alternative embodiments, the units of the horizontal axis 310 may be transmission time, time slot, or any other desirable units.

FIG. 3A conceptually illustrates the data stream 300 after being processed by the header compression unit 220, such as shown in FIG. 2. At this point in the processing, the data stream 300 includes data packets 315(1-5). The data packets 315(1, 3-5) have been compressed by the header compression unit 220. The data packet 315(2) has not been compressed (or has only been partially compressed) by the header compression unit 220.

FIG. 3B conceptually illustrates the data stream 300 after being processed by the packet splitting unit 225, such as shown in FIG. 2. At this point in the processing, the first embodiment of the data stream 300 includes compressed data packets 315(1, 5) and data packets 320(1-3) that have been formed by splitting the uncompressed data packet 315(2). The data packets 320(1-3) include information indicative of the header and payload of the uncompressed data packet 315(2). Two selected data packets 315(3-4) have been dropped from the data stream 300. In the first embodiment, the data packet 320(1) is transmitted in a time slot associated with the uncompressed data packet 315(2) and data packets 320(2-3) are transmitted in time slots associated with the selected data packets 305(3-4).

FIG. 3C conceptually illustrates the data stream 300 after being processed by the packet assembly unit 245, such as shown in FIG. 2. At this point in the processing, the first embodiment of the data stream 300 includes compressed data packets 315(1,5) and reconstructed data packet 325(2). Although only one reconstructed data packet 325(2) is shown in FIG. 3C, it has been given the index "2" to indicate that the reconstructed data packet 325(2) includes information indicative of the header and/or payload of the uncompressed data packet 315(2). In one embodiment, the reconstructed data packet 325 includes substantially the same information as the uncompressed data packet 315(2). A gap 330 may also be present in the data stream 300 because of the dropped data packets 315(3-4). The gap 330 may lead to some reduction in voice quality when speech frames are transmitted. However, the effect is likely to be small, at least in part because of the small number of affected packets and the relatively low occurrence of uncompressed packet transmission.

Figure 4A:
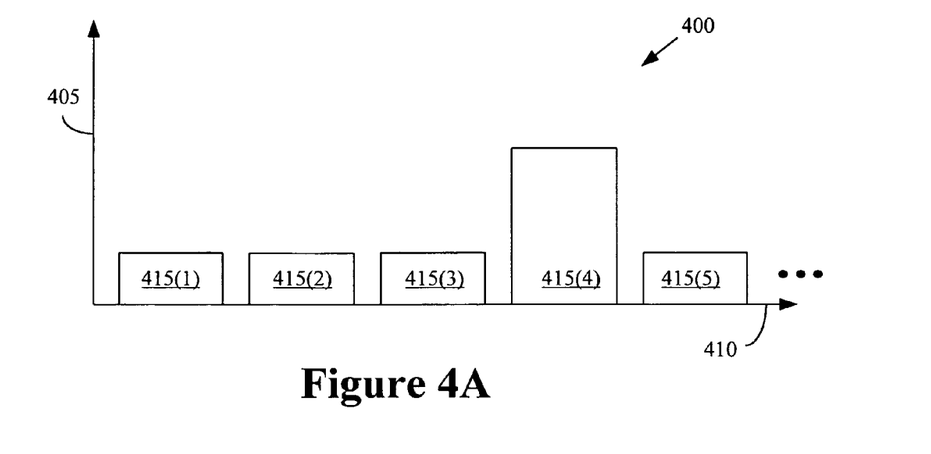
FIGS. 4A, 4B, and 4C conceptually illustrate a second embodiment of a data stream as the data stream is modified during operation of a second embodiment of the present invention.
Figure 4B:
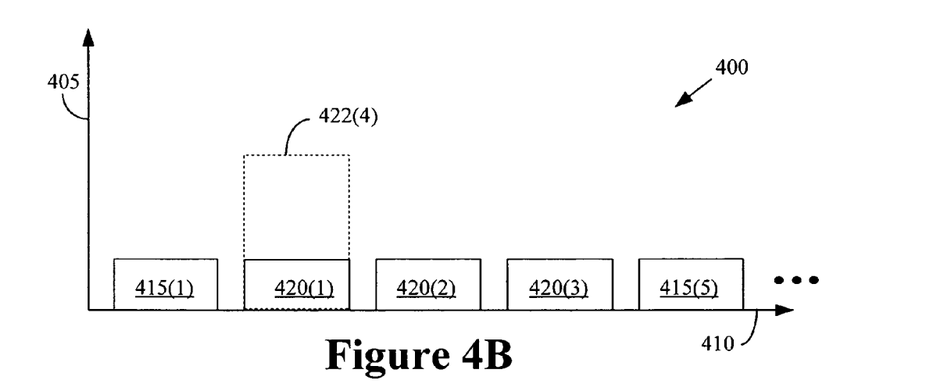
Figure 4C:
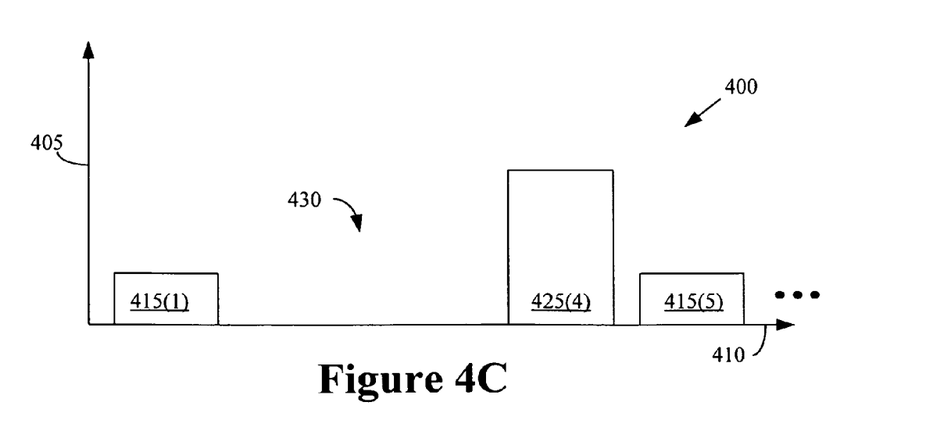

FIGS. 4A, 4B, and 4C conceptually illustrate a second embodiment of a data stream 400 as the data stream 400 is modified during operation of a second embodiment of the present invention. The vertical axis 405 in FIGS. 4A-C indicates the size of the data packets in the data stream 400. In various embodiments, the units of the vertical axis 405 may be bits, bytes, or any other desirable unit of measurement. The horizontal axis 410 in FIGS. 4A-C indicates the sequence of the data packets in the data stream 400. In various alternative embodiments, the units of the horizontal axis 410 may be transmission time, time slot, or any other desirable units.

FIG. 4A conceptually illustrates the data stream 400 after being processed by the header compression unit 220, such as shown in FIG. 2. At this point in the processing, the data stream 400 includes data packets 415(1-5). The data packets 415(1-3, 5) have been compressed by the header compression unit 220. The data packet 415(4) has not been compressed (or has only been partially compressed) by the header compression unit 220.

FIG. 4B conceptually illustrates the data stream 400 after being processed by the packet splitting unit 225, such as shown in FIG. 2. At this point in the processing, the second embodiment of the data stream 400 includes compressed data packets 415(1, 5) and data packets 420(1-3). The second embodiment of the data stream 400 differs from the first embodiment of the data stream 300 shown in FIGS. 3A-C in that a "virtual" packet 422(4) is created and then the virtual packet 422(4) is used to from the data packets 420(1-3). The virtual data packet 422(4) has been given the index "4" to indicate that it may include information indicative of the header and/or payload of the uncompressed data packet 415 (4).

The virtual packet 422(4) is formed by forming a virtual uncompressed header for the uncompressed data packet 415 (4). In one embodiment, the virtual uncompressed header for the uncompressed data packet 415(4) is predicted because the uncompressed data packet 415(4) is not present when the data packets 420(1) and 420(2) are sent. For example, in some embodiments of Robust Header Compression (RoHC) algorithms, the packet header of the uncompressed data packet 415(4) may be predicted. In one embodiment, the data packets 420(1) and 420(2) include the predicted virtual uncompressed header and the data packet 420(3) includes a speech data frame. Two selected data packets 415(2-3) have been dropped from the data stream 400. In the second embodiment, the data packets 420(1-2) are transmitted in time slots associated with the selected data packets 415(2-3) and the data packet 420(3) is transmitted in a time slot associated with the uncompressed data packet 415(4).

FIG. 4C conceptually illustrates the data stream 400 after being processed by the packet assembly unit 245, such as shown in FIG. 2. At this point in the processing, the second embodiment of the data stream 400 includes compressed data packets 415(1, 5) and reconstructed data packet 425(4). The reconstructed data packet 425(4) has been given the index "4" to indicate that it may include information indicative of the header and/or payload of the uncompressed data packet 415 (4) and/or the virtual data packet 422(4). In one embodiment, the reconstructed data packet 425(4) includes substantially the same information as the uncompressed data packet 415 (4). A gap 430 may also be present in the data stream 400 because of the dropped data packets 415(2-3). The gap 430 may lead to some reduction in voice quality when speech frames are transmitted. However, the effect is likely to be small, at least in part because of the small number of affected packets and the relatively low occurrence of uncompressed packet transmission. Furthermore, the second embodiment of the data stream 400 reduces the gap 430 between the last fully transmitted header, e.g. the packet header of the reconstructed data packet 425(4), and the compressed data packet 415(5).

Figure 5:
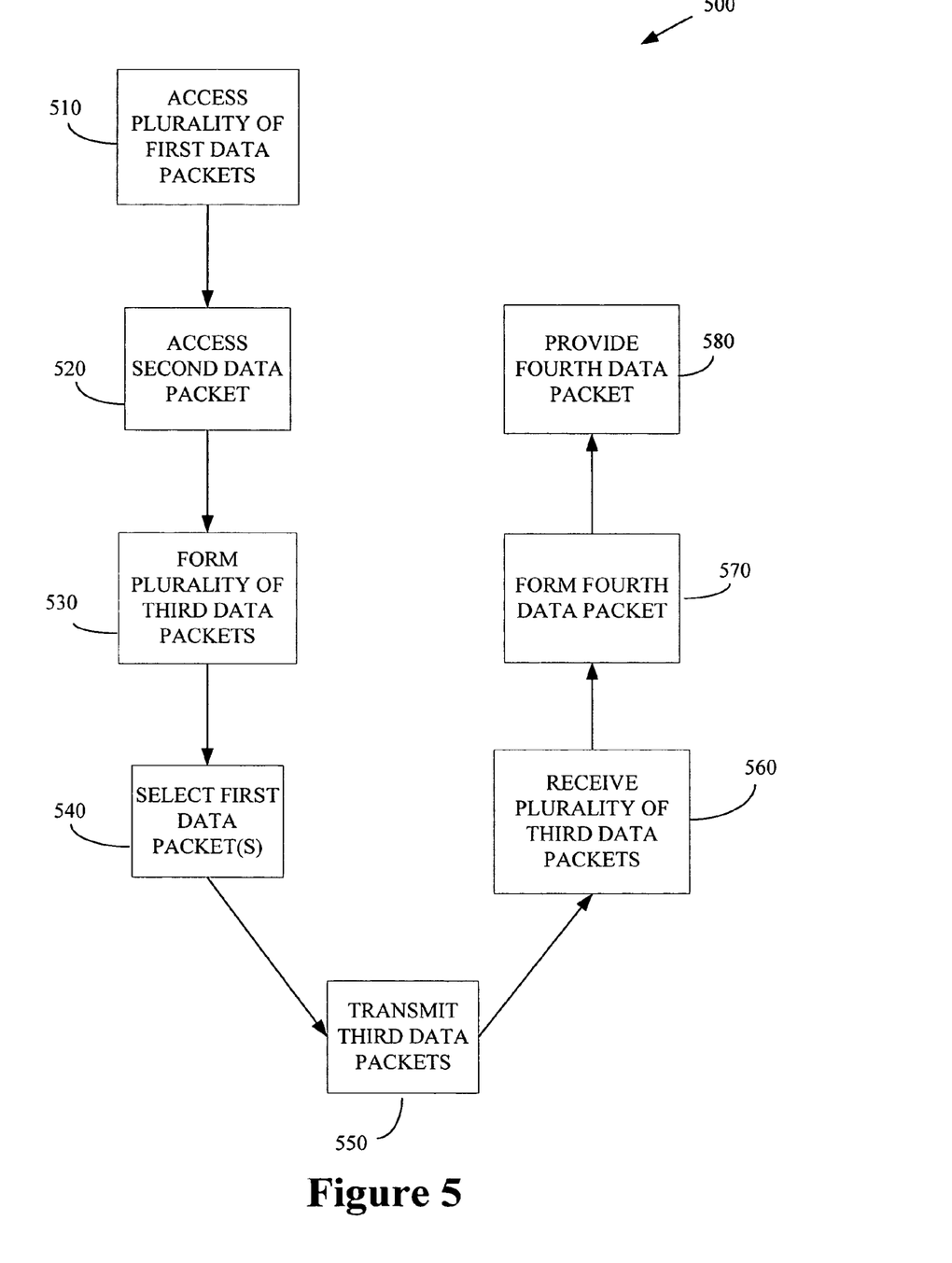
FIG. 5 conceptually illustrates one embodiment of a method of wireless telecommunications, in accordance with the present invention.

FIG. 5 conceptually illustrates one embodiment of a method 500 of wireless telecommunications. A plurality of first data packets is accessed (at 510). In one embodiment, the first data packets are compressed data packets containing a compressed header and a payload that includes a speech data frame. In various alternative embodiments, the first data packets may be accessed (at 510) sequentially, in groups, or in any other desirable order. At least one second data packet is accessed (at 520). In one embodiment, the second data packet is an uncompressed (or partially compressed) data packet containing a header and a payload that includes a speech data frame. As discussed above, a size of the second data packet may be larger than a size of the first data packets. In various alternative embodiments, the method 500 can be used whenever packets of a larger size than the fully compressed packets are sent. For example, data packets with intermediate header sizes may be transmitted. In that case, only one compressed packet may be dropped.

A third plurality of data packets is formed (at 530) using the second data packet, based on the sizes of the first and second data packets. In one embodiment, the number of third data packets is approximately equal to the ratio of the sizes of the second data packet to one of the first data packets. One or more of the first data packets are then selected (at 540) and, in one embodiment, the selected first data packets are dropped from the data stream. The third plurality of data packets are then transmitted (at 550) as part of the data stream, as discussed above.

The data stream is received (at 560). For example, the data stream may be received (at 560) by a reception unit like the reception unit 210 shown in FIG. 2. The received data stream includes the third plurality of data packets. At least one fourth data packet is then formed (at 570) using the received third plurality of data packets. In one embodiment, the third plurality of data packets include information indicative of the data in an uncompressed data packet and forming (at 570) the fourth data packet includes reconstructing the uncompressed data packet such that the fourth data packet includes substantially all of the information contained in the uncompressed data packet. The fourth data packet, as well as any other received data packets, may be provided (at 580). For example, a reconstructed uncompressed data packet and a plurality of compressed data packets may be provided (at 580) to other components of a reception unit, or other devices that are communicatively coupled to the reception unit.

The method 500, as well as any other embodiment of the present invention, may be implemented in any desirable entity. In one embodiment, the method 500 may be part of the header compression algorithm, such as the algorithm implemented by the header compression unit 220 shown in FIG. 2. This has the advantage that the header compression algorithm may be optimized to account for the fact that one or more packets may be dropped after transmission of the uncompressed data packet. Alternatively, in UMTS, the method 500 may be implemented in a Packet Data Convergence Protocol (PDCP) entity that may be located in sender (such as the transmission unit 205 Shown in FIG. 2) and/or in a receiver (such as the reception unit 210 shown in FIG. 2). In another alternative embodiment, the method 500 may be implemented after the header compression algorithm has been performed. This has the advantage that no change of the header compression algorithm is needed. For example, in UMTS, the method 500 may be implemented between a PDCP entity and a Radio Link Control (RLC) entity in the sender side. The method 500 may alternatively be implemented in the RLC entity.

Various embodiments of the present invention may have one or more advantages over conventional wireless communication techniques. For example, the present invention may reduce the maximum data rate of a VoIP radio bearer to less than or about 16 kbps. Thus, a physical downlink channel with a higher spreading factor can be allocated. This saves the scarce downlink code resources and makes the VoIP transmission as efficient as conventional circuit-switched voice transmission. For another example, the present invention may reduce the impact of secondary code channel downlink interference. Thus, scarce downlink radio resources may be saved. The present invention may also be applied to an uplink and thus the same interference reduction is also achieved on the uplink and the uplink radio resources may be saved. For yet another example, when radio bearers with a generally lower data rate are allocated according to the present invention, the uplink channel element allocation efficiency is much higher than when the radio bearers are allocated under the worst-case assumption that uncompressed data is contained in every data packet.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of splitting packets for use in wireless communication, comprising:
   accessing, at a wireless transmission unit, a plurality of first data packets having a first size;
   accessing, at the wireless transmission unit, at least one second data packet having a second size, the second size being larger than the first size;
   forming, at the wireless transmission unit, a plurality of third data packets comprising portions of the at least one second data packet based upon the first and second sizes, wherein number of third packets is given by a ratio of the second size to the first size;
   dropping at least one of the plurality of first data packets, wherein number of dropped first data packets being one less that the number of third data packets; and
   transmitting, from the wireless transmission unit, the plurality of third data packets in time slots allocated to said at least one second data packet and said at least one dropped first data packet.

2. The method of claim 1, wherein accessing the plurality of first data packets comprises accessing a plurality of compressed data packets.

3. The method of claim 2, wherein accessing the plurality of first data packets comprises accessing a plurality of first data packets including a speech frame and a compressed packet header.

4. The method of claim 1, wherein accessing the plurality of first data packets comprises accessing a plurality of first data packets associated with consecutive time slots.

5. The method of claim 1, wherein accessing said at least one second data packet comprises accessing at least one of an uncompressed data packet and a partially compressed data packet.

6. The method of claim 5, wherein accessing at least one of the uncompressed data packet and the partially compressed data packet comprises accessing at least one second data packet including a speech frame and at least one of an uncompressed packet header and a partially compressed packet header.

7. The method of claim 1, wherein forming the plurality of third data packets comprises determining header information based upon header information associated with one of the first data packets that is scheduled to be transmitted before the second data packet.

8. The method of claim 1, wherein forming the plurality of third data packets comprises determining header information based upon predicted header information associated with one of the first data packets that is scheduled to be transmitted after the second data packet.

9. The method of claim 8, wherein forming the plurality of third data packets comprises forming a virtual data packet based on the predicted header information.

10. The method of claim 1, wherein selecting said at least one of the plurality of first data packets comprises selecting a number of first data packets that is equal to one less than the number of third data packets.

11. The method of claim 1, comprising transmitting the plurality of third data packets in consecutive time slots.

12. The method of claim 1, wherein accessing said at least one second data packet comprises accessing a plurality of second data packets.

13. A method of splitting packets for use in wireless communication, comprising:
   receiving, at a reception unit and from a transmission unit, a plurality of first data packets having a first size, wherein receiving the plurality of first data packets comprises receiving a plurality of data packets comprising information indicative of an uncompressed data packet; and
   forming, at the reception unit, at least one second data packet having a second size based on the plurality of first data packets, the second size being larger than the first size, and wherein at least one of the plurality of first data packets is transmitted in at least one time slot allocated to at least one third data packet that, wherein was dropped by the transmission unit to allow the plurality of first data packets to be transmitted.

14. The method of claim 13, wherein forming the at least one second data packet comprises forming a reconstructed data packet based on the information indicative of the uncompressed data packet.

15. The method of claim 14, wherein forming the reconstructed data packet based on the information indicative of the uncompressed data packet comprises forming a reconstructed data packet that comprises the same information as the uncompressed data packet.

16. The method of claim 13, wherein receiving the plurality of first data packets comprises receiving a plurality of first data packets comprising information indicative of a speech frame and a packet header.

17. The method of claim 16, wherein receiving the plurality of first data packets comprising information indicative of the packet header comprises receiving the plurality of first data packets comprising information indicative of a predicted packet header.

18. The method of claim 13, comprising receiving at least one third data packet.

19. The method of claim 18, wherein receiving the at least one third data packet comprises receiving at least one compressed data packet.

* * * * *